US009790449B2

(12) United States Patent
Matsumoto

(10) Patent No.: US 9,790,449 B2
(45) Date of Patent: Oct. 17, 2017

(54) LUBRICANT OIL COMPOSITION FOR COMPRESSION REFRIGERATOR

(75) Inventor: Tomoya Matsumoto, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 82 days.

(21) Appl. No.: 14/130,197

(22) PCT Filed: Jun. 28, 2012

(86) PCT No.: PCT/JP2012/066584
§ 371 (c)(1),
(2), (4) Date: Jan. 13, 2014

(87) PCT Pub. No.: WO2013/005645
PCT Pub. Date: Jan. 10, 2013

(65) Prior Publication Data
US 2014/0135241 A1   May 15, 2014

(30) Foreign Application Priority Data
Jul. 1, 2011   (JP) ................................ 2011-147787

(51) Int. Cl.
| | | |
|---|---|---|
| *C07C 69/34* | (2006.01) |
| *C10L 1/18* | (2006.01) |
| *C10M 129/16* | (2006.01) |
| *C09K 5/04* | (2006.01) |
| *C10M 171/00* | (2006.01) |
| *C10M 129/10* | (2006.01) |
| *C10M 129/18* | (2006.01) |
| *C10M 137/04* | (2006.01) |
| *C10M 105/38* | (2006.01) |
| *C10M 107/24* | (2006.01) |
| *C10M 107/32* | (2006.01) |
| *C10M 107/34* | (2006.01) |

(52) U.S. Cl.
CPC .......... *C10M 129/16* (2013.01); *C09K 5/045* (2013.01); *C10M 105/38* (2013.01); *C10M 107/24* (2013.01); *C10M 107/32* (2013.01); *C10M 107/34* (2013.01); *C10M 129/10* (2013.01); *C10M 129/18* (2013.01); *C10M 137/04* (2013.01); *C10M 171/008* (2013.01); *C10M 2207/026* (2013.01); *C10M 2207/042* (2013.01); *C10M 2207/2835* (2013.01); *C10M 2209/043* (2013.01); *C10M 2209/1033* (2013.01); *C10M 2209/1055* (2013.01); *C10M 2223/041* (2013.01); *C10M 2229/02* (2013.01); *C10N 2220/302* (2013.01); *C10N 2230/08* (2013.01); *C10N 2230/12* (2013.01); *C10N 2240/30* (2013.01)

(58) Field of Classification Search
CPC .............. C10M 107/04; C10M 107/20; C10M 2209/003

USPC .................................................. 508/465, 475
See application file for complete search history.

(56) References Cited

U.S. PATENT DOCUMENTS

| | | | |
|---|---|---|---|
| 5,202,044 A | 4/1993 | Hagihara et al. | |
| 5,746,933 A | 5/1998 | Ishida et al. | |
| 6,228,820 B1 * | 5/2001 | Sakai ..................... | C07C 69/28 252/68 |
| 6,656,891 B1 * | 12/2003 | Sakanoue et al. ............ | 508/579 |
| 2008/0237534 A1 | 10/2008 | Kajiki et al. | |
| 2010/0147016 A1 | 6/2010 | Kaneko et al. | |
| 2010/0175421 A1 | 7/2010 | Kaneko et al. | |
| 2011/0049414 A1 | 3/2011 | Kaneko et al. | |
| 2011/0057146 A1 | 3/2011 | Kaneko et al. | |

FOREIGN PATENT DOCUMENTS

| | | |
|---|---|---|
| CN | 101730734 A | 6/2010 |
| CN | 101945979 A | 1/2011 |
| CN | 101945980 A | 1/2011 |
| EP | 2 161 323 A1 | 3/2010 |
| EP | 2 243 817 A1 | 10/2010 |
| EP | 2 243 818 A1 | 10/2010 |
| EP | 2 551 334 A1 | 1/2013 |
| EP | 2 727 981 A1 | 5/2014 |
| EP | 2 772 526 A1 | 9/2014 |
| JP | 02 258896 | 10/1990 |
| JP | 02 281098 | 11/1990 |
| JP | 02 305893 | 12/1990 |
| JP | 05 209171 | 8/1993 |
| JP | 06 336594 | 12/1994 |
| JP | 08 239679 | 9/1996 |

(Continued)

OTHER PUBLICATIONS

International Search Report Issued Sep. 25, 2012 in PCT/JP12/066584 Filed Jun. 28, 2012.

(Continued)

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

The present invention is able to provide a lubricating oil composition for compression refrigerating machine having excellent thermal/chemical stability even when used for a compression refrigerating machine using a saturated fluorinated hydrocarbon refrigerant having a low carbon number and a low global warming potential, by using a refrigerant containing a saturated fluorinated hydrocarbon having from 1 to 3 carbon atoms, which uses, as a base oil, an oxygen-containing organic compound composed of at least one member selected from a polyoxyalkylene glycol, a polyvinyl ether, a copolymer of a poly(oxy)alkylene glycol and a polyvinyl ether, a copolymer of a poly(oxy)alkylene glycol monoether and a polyvinyl ether, and a polyol ester, each having a hydroxyl value of not more than 15 mgKOH/g.

19 Claims, No Drawings

(56) References Cited

FOREIGN PATENT DOCUMENTS

| JP | 10-147682 A | 6/1998 |
|----|----|----|
| JP | 2001 183020 | 7/2001 |
| JP | 2006 160781 | 6/2006 |
| JP | 2010 215756 | 9/2010 |
| WO | 97 11933 | 4/1997 |
| WO | 2008 130039 | 10/2008 |
| WO | 2008 153106 | 12/2008 |
| WO | 2009 101872 | 8/2009 |
| WO | 2009 101873 | 8/2009 |

OTHER PUBLICATIONS

Extended European Search Report issued Feb. 10, 2015 in Patent Application No. 12806905.1.
Office Action issued Jun. 23, 2015 in Japanese Patent Application No. 2011-17787.
U.S. Appl. No. 14/130,119, filed Jan. 13, 2014, Matsumoto.
The Decision of Rejection issued Mar. 29, 2016, in Chinese Application No. 201280031630.4 filed Jun. 28, 2012 (with English translation).
Guoyuan, M.A., "Refrigerating Compressor and Its Application", China Architecture & Building Press, $1^{st}$ Edition, pp. 33-35 (Feb. 2008).

\* cited by examiner

LUBRICANT OIL COMPOSITION FOR COMPRESSION REFRIGERATOR

TECHNICAL FIELD

The present invention relates to a lubricating oil composition for compression refrigerating machine, and in detail, it relates to a lubricating oil composition for compression refrigerating machine having good heat/oxidation stability, which uses, as a refrigerant, a saturated fluorinated hydrocarbon having a low carbon number.

BACKGROUND ART

In recent years, in compression refrigerating machines such as an air conditioner, a car air conditioner, etc., a saturated fluorinated hydrocarbon (HFC) having 1 or 2 carbon atoms, that is a refrigerant which does not destruct an ozone layer, is used. However, recently, these compression refrigerating machines have been frequently used under a long-term severe condition more and more.

In consequence, a lubricating oil composition which is used for such a compression refrigerating machine is demanded to have excellent heat/oxidation stability.

In addition, conventionally, mixed refrigerants containing difluoromethane (R32), for example, R410A, R407C, etc., have been used as an HFC refrigerant which does not destruct an ozone layer, for various compression refrigerating machines inclusive of an air conditioner.

However, furthermore, in view of the fact that in addition to protection of an ozone layer, it was considered to be necessary to prevent the global warming, the use of a refrigerant containing a higher amount of R32 having a low global warming potential has been desired.

Since R32 is relatively high in a theoretical COP or a heat transfer coefficient and low in a pressure loss of a refrigerant, it has such properties that when used for air conditioning apparatuses, it is high in energy efficiency.

However, R32 has such properties that the discharge temperature of a compressor is higher by substantially about 20° C. than that of conventional R410A and R407C.

Under those circumstances, studies for improving structures of refrigerating apparatus are conducted (see, for example, PLT 1).

In addition, for lubricating oils for compression refrigerating machine using such a refrigerant, a lubricating oil composition having high heat/oxidation stability in the presence of such a refrigerant is demanded.

However, different from unsaturated HFC or iodides, saturated HFC has high stability and was considered to be able to respond to such a demand by adding an existing antioxidant or acid scavenger which is used in R134a and the like (see, for example, PLTs 2 to 4). However, even when an existing antioxidant or acid scavenger is merely added, or its adding amount is increased, an effect for increasing the heat/oxidation stability could not be satisfied.

CITATION LIST

Patent Literature

PTL 1: JP-A-2001-183020
PTL 2: JP-A-02-258896
PTL 3: JP-A-02-281098
PTL 4: JP-A-02-305893

SUMMARY OF INVENTION

Technical Problem

Under those circumstances, an object of the present invention is to provide a lubricating oil composition for compression refrigerating machine having excellent heat/oxidation stability even when used for a compression refrigerating machine using a saturated fluorinated hydrocarbon refrigerant having a low carbon number and a low global warming potential.

Solution to Problem

In order to achieve the above-described object, the present inventor made extensive and intensive investigations. As a result, it has been found that the object can be achieved by using, as abase oil, an oxygen-containing organic compound having specified properties. The present invention has been accomplished on the basis of such knowledge.

Specifically, the present invention provides:
(1) A lubricating oil composition for compression refrigerating machine using a refrigerant containing a saturated fluorinated hydrocarbon having from 1 to 3 carbon atoms, the lubricating oil composition using, as a base oil, an oxygen-containing organic compound containing at least one member selected from a polyoxyalkylene glycol, a polyvinyl ether, a copolymer of a poly(oxy)alkylene glycol and a polyvinyl ether, a copolymer of a poly(oxy)alkylene glycol monoether and a polyvinyl ether, and a polyol ester, each having a hydroxyl value of not more than 15 mgKOH/g;
(2) The lubricating oil composition for compression refrigerating machine as set forth above in (1), wherein the oxygen-containing organic compound is composed of, as a major component, a polyvinyl-based compound having a constituent unit represented by a general formula (II) described below:

(in the formula, each of $R^4$, $R^5$, and $R^6$ represents a hydrogen atom or a hydrocarbon group having from 1 to 8 carbon atoms, and they may be the same as or different from each other; $R^7$ represents a divalent hydrocarbon group having from 2 to 10 carbon atoms; $R^8$ represents a hydrocarbon group having from 1 to 10 carbon atoms; p represents a number of from 0 to 10 in terms of an average value thereof; $R^4$ to $R^8$ may be the same as or different from each other for every constituent unit; and when plural $R^7Os$ are present, the plural $R^7Os$ may be the same as or different from each other);
(3) The lubricating oil composition for compression refrigerating machine as set forth above in (1) or (2), containing at least one of an antioxidant and an acid scavenger;
(4) The lubricating oil composition for compression refrigerating machine as set forth above in any one of (1) to (3), wherein the saturated fluorinated hydrocarbon having from 1 to 3 carbon atoms is difluoromethane (R32);
(5) The lubricating oil composition for compression refrigerating machine as set forth above in any one of (1) to (4), wherein the refrigerant is a mixture of difluoromethane (R32) and pentafluoroethane (R125), or a mixture of difluoromethane (R32), pentafluoroethane (R125), and 1,1,1,2-tetrafluoroethane (R134a);

(6) The lubricating oil composition for compression refrigerating machine as set forth above in (5), wherein the refrigerant is a refrigerant containing 70% by mass or more of difluoromethane (R32);

(7) The lubricating oil composition for compression refrigerating machine as set forth above in any one of (1) to (6), wherein the base oil has a kinematic eddy viscosity at 100° C. of 1 mm²/s or more and not more than 50 mm²/s;

(8) The lubricating oil composition for compression refrigerating machine as set forth above in any one of (1) to (7), wherein the base oil has a number average molecular weight of 300 or more and not more than 3,000;

(9) The lubricating oil composition for compression refrigerating machine as set forth above in any one of (1) to (8), wherein the base oil has a viscosity index of 60 or more;

(10) The lubricating oil composition for compression refrigerating machine as set forth above in any one of (1) to (9), further containing at least one member of additives selected from an extreme pressure agent, an oiliness agent, a metal deactivator, and a defoaming agent;

(11) The lubricating oil composition for compression refrigerating machine as set forth above in any one of (1) to (10), wherein a sliding portion of the compression refrigerating machine is one composed of an engineering plastic, or one having an organic coating film or an inorganic coating film;

(12) The lubricating oil composition for compression refrigerating machine as set forth above in (11), wherein the organic coating film is any one of a polytetrafluoroethylene coating film, a polyimide coating film, a polyamide-imide coating film, and a thermosetting insulating film formed using a resin coating material containing a resin base material composed of a polyhydroxy ether resin and a polysulfone-based resin and a crosslinking agent;

(13) The lubricating oil composition for compression refrigerating machine as set forth above in (11), wherein the inorganic coating film is any one of a graphite film, a diamond-like carbon film, a tin film, a chromium film, a nickel film, and a molybdenum film;

(14) The lubricating oil composition for compression refrigerating machine as set forth above in any one of (1) to (13), which is used for a car air conditioner, an electric car air conditioner, a gas heat pump, an air conditioner, a refrigerator, an automatic vending machine, a showcase, a hot water supply system, or a refrigerating/heating system; and

(15) The lubricating oil composition for compression refrigerating machine as set forth above in (14), wherein the system has a water content of not more than 300 ppm by mass and a residual air partial pressure of not more than 10 kPa.

Advantageous Effects of Invention

According to the present invention, a lubricating oil composition for compression refrigerating machine having excellent thermal/chemical stability even when used for a compression refrigerating machine using a saturated fluorinated hydrocarbon refrigerant having a low carbon number and a low global warming potential, can be provided.

DESCRIPTION OF EMBODIMENTS

The present invention is concerned with a lubricating oil composition for compression refrigerating machine using a refrigerant containing a saturated fluorinated hydrocarbon having from 1 to 3 carbon atoms, the lubricating oil composition using, as a base oil, an oxygen-containing organic compound having a hydroxyl group value of not more than 15 mgKOH/g.

<Base Oil>

The base oil which is used in the present invention is an oxygen-containing organic compound having a hydroxyl value of not more than 15 mgKOH/g.

When an oxygen-containing organic compound having a hydroxyl value exceeding 15 mgKOH/g is used as the base oil, the thermal/chemical stability of a refrigerating machine oil is lowered, and at the same time, the refrigerant causes change in properties and deterioration, and therefore, there is a concern that a good operation of the refrigerating system cannot be conducted. That is, in a manner of speaking, a refrigerating machine fluid composition which is formed of the refrigerant and the lubricating oil composition for refrigerating machine will cause deterioration and change in properties in an early stage.

In consequence, the hydroxyl value of the oxygen-containing organic compound is preferably not more than 10 mgKOH/g, more preferably not more than 5 mgKOH/g, and especially preferably not more than 3 mgKOH/g.

Incidentally, the hydroxyl value is a value measured by a method defined according to JIS K0070.

The oxygen-containing organic compound which is used as the base oil in the present invention is an oxygen-containing organic compound containing at least one member selected from a polyoxyalkylene glycol, a polyvinyl ether, a copolymer of a poly(oxy)alkylene glycol and a polyvinyl ether, a copolymer of a poly(oxy)alkylene glycol monoether and a polyvinyl ether, and a polyol ester.

[Polyoxyalkylene Glycol]

Examples of the polyoxyalkylene glycol which can be used as the above-described base oil include a compound represented by a general formula (I).

$$R^1—[(OR^2)_m—OR^3]_n \quad (I)$$

(In the formula, $R^1$ represents a hydrogen atom, a monovalent hydrocarbon group having from 1 to 10 carbon atoms, an acyl group having from 2 to 10 carbon atoms, a hydrocarbon group having from 1 to 10 carbon atoms and having from 2 to 6 bonding sites, or an oxygen-containing hydrocarbon group having from 1 to 10 carbon atoms; $R^2$ represents an alkylene group having from 2 to 4 carbon atoms; $R^3$ represents a hydrogen atom, a hydrocarbon group having from 1 to 10 carbon atoms, an acyl group having from 2 to 10 carbon atoms, or an oxygen-containing hydrocarbon group having from 1 to 10 carbon atoms; n represents an integer of from 1 to 6; and m represents a number of from 6 to 80 in terms of an average value of (m×n).)

In the foregoing general formula (I), the monovalent hydrocarbon group having from 1 to 10 carbon atoms for each of $R^1$ and $R^3$ may be linear, branched, or cyclic. The hydrocarbon group is preferably an alkyl group, and specific examples thereof include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, a cyclohexyl group, and the like. When the carbon number of this alkyl group exceeds 10, there may be the case where the compatibility with the refrigerant is lowered, thereby causing phase separation. The carbon number of the alkyl group is preferably from 1 to 6.

In addition, the hydrocarbon group moiety of the acyl group having from 2 to 10 carbon atoms for each of $R^1$ and $R^3$ may be linear, branched, or cyclic. The hydrocarbon group moiety of the acyl group is preferably an alkyl group, and specific examples thereof include the same various groups having from 1 to 9 carbon atoms as those exemplified above for specific examples of the alkyl group. When the carbon number of the acyl group exceeds 10, there may be the case where the compatibility with the refrigerant is lowered, thereby causing phase separation. The carbon number of the acyl group is preferably from 2 to 6.

In the case where both of $R^1$ and $R^3$ are a hydrocarbon group or an acyl group, $R^1$ and $R^3$ may be the same as or different from each other.

Furthermore, in the case where n is 2 or more, plural $R^3$ as in one molecule may be the same as or different from each other.

In the case where $R^1$ is a hydrocarbon group having from 1 to 10 carbon atoms and having from 2 to 6 bonding sites, this hydrocarbon group may be chained, or it may be cyclic. The hydrocarbon group having 2 bonding sites is preferably an aliphatic hydrocarbon group, and examples thereof include an ethylene group, a propylene group, a butylene group, a pentylene group, a hexylene group, a heptylene group, an octylene group, a nonylene group, a decylene group, a cyclopentylene group, a cyclohexylene group, and the like. Examples of other hydrocarbon group include residual groups formed by removing a hydroxyl group from a bisphenol such as bisphenol, bisphenol F, bisphenol A, etc. In addition, the hydrocarbon group having from 3 to 6 bonding sites is preferably an aliphatic hydrocarbon group, and examples thereof include residual groups formed by removing a hydroxyl group from a polyhydric alcohol such as trimethylolpropane, glycerin, pentaerythritol, sorbitol, 1,2,3-trihydroxycyclohexane, 1,3,5-trihydroxycyclohexane, etc.

When the carbon number of this aliphatic hydrocarbon group exceeds 10, there may be the case where the compatibility with the refrigerant is lowered, thereby causing phase separation. The carbon number is preferably from 2 to 6.

Furthermore, examples of the oxygen-containing hydrocarbon group having from 1 to 10 carbon atoms for each of $R^1$ and $R^3$ include a chained aliphatic group and a cyclic aliphatic group each having an ether bond, and in particular, a tetrahydrofurfuryl group is preferable.

In the present invention, at least one of the above-described $R^1$ and $R^3$ is preferably an alkyl group, and especially preferably an alkyl group having from 1 to 3 carbon groups. Above all, a methyl group is preferable from the standpoint of viscosity properties. Furthermore, for the same reasons as those described above, both of $R^1$ and $R^3$ are preferably an alkyl group, and especially preferably a methyl group.

In the foregoing general formula (I), $R^2$ represents an alkylene group having from 2 to 4 carbon atoms, and examples of the oxyalkylene group that is a repeating unit include an oxyethylene group, an oxypropylene group, and an oxybutylene group. The oxyalkylene groups in one molecule may be the same as each other, and two or more kinds of oxyalkylene groups may be contained. However, at least an oxypropylene unit is preferably contained in one molecule, and an oxypropylene unit is especially preferably contained in an amount of 50% by mole or more in the oxyalkylene unit.

In the foregoing general formula (I), n represents an integer of from 1 to 6 and is determined corresponding to the number of bonding sites of $R^1$. For example, in the case where $R^1$ is an alkyl group or an acyl group, n is 1, and in the case where $R^1$ is an aliphatic hydrocarbon group having 2, 3, 4, 5, or 6 bonding sites, n is 2, 3, 4, 5, or 6, respectively. In addition, m represents a number of from 6 to 80 in terms of an average value of (m×n). When the average value of (m×n) deviates the foregoing ranges, the object of the present invention is not sufficiently achieved, for example, when the average value exceeds 80, there is a concern that the compatibility is lowered, thereby deteriorating the oil return properties, or the like.

In the polyoxyalkylene glycol represented by the foregoing general formula (I), a polyoxypropylene glycol dimethyl ether represented by a general formula (I-a) and a polyoxyethylene polyoxypropylene glycol dimethyl ether represented by a general formula (I-b) are preferable.

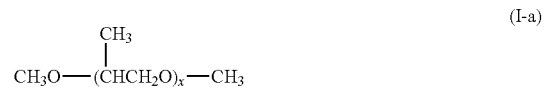

(I-a)

(In the formula, x represents a number of from 6 to 80.)

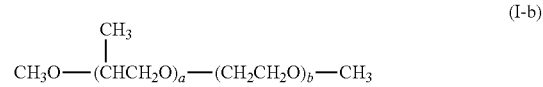

(I-b)

(In the formula, each of a and b is a number of 1 or more, a total sum of which is from 6 to 80.)

Incidentally, as for the polyoxyalkylene glycol represented by the foregoing general formula (I), all of those described in detail in JP-A-2-305893 can be used.

In the present invention, this polyoxyalkylene glycol may be used solely, or it may be used in combination of two or more kinds thereof.

The above-described polyoxyalkylene glycol derivative can be obtained, for example, by polymerizing an alkylene oxide having from 2 to 4 carbon atoms, such as ethylene oxide, propylene oxide, etc., while using water or an alkali hydroxide as an initiator to obtain a polyoxyalkylene glycol having a hydroxyl group on both terminals thereof and then etherifying or esterifying the both terminals of the hydroxyl groups by using an alkyl halide or an acyl halide.

In addition, the polyoxyalkylene glycol derivative can also be produced by polymerizing an alkylene oxide having from 2 to 4 carbon atoms while using a monohydric alcohol having from 1 to 10 carbon atoms or an alkali metal salt thereof as an initiator to obtain a polyoxyalkylene glycol monoalkyl ether having an ether bond on one terminal thereof and a hydroxyl group on the other terminal and then etherifying or esterifying this hydroxyl group. Incidentally, in the case of producing a compound represented by the general formula (I) wherein n is 2 or more, a divalent to hexavalent polyhydric alcohol may be used as the initiator in place of the monohydric alcohol.

On the occasion of producing the polyoxyalkylene glycol derivative by such a method, with respect to a proportion of the polyoxyalkylene glycol or the like and the alkyl halide or the acyl halide in the etherification or esterification reaction, in the case where the amount of the alkyl halide or the acyl halide is smaller than a stoichiometric amount, the hydroxyl group remains, and the hydroxyl group value increases. In consequence, it is desirable to optimize a molar ratio of the polyoxyalkylene glycol or the like and the alkyl halide or the acyl halide. In addition, coloration can be suppressed by conducting the polymerization and the etherification or esterification reaction in an inert gas atmosphere.

[Polyvinyl Ether]

In the refrigerating machine oil composition of the present invention, the polyvinyl ether which can be used as the base oil is one composed of, as a major component, a polyvinyl-based compound having a constituent unit represented by a general formula (II).

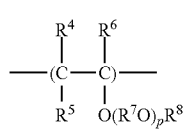
(II)

In the foregoing general formula (II), each of $R^4$, $R^5$, and $R^6$ represents a hydrogen atom or a hydrocarbon group having from 1 to 8 carbon atoms, and they may be the same as or different from each other. Specifically, examples of the hydrocarbon group as referred to herein include an alkyl group such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, etc.; a cycloalkyl group such as a cyclopentyl group, a cyclohexyl group, various methylcyclohexyl groups, various ethylcyclohexyl groups, various dimethylcyclohexyl groups, etc.; an aryl group such as a phenyl group, various methylphenyl groups, various ethylphenyl groups, various dimethylphenyl groups, etc.; and an arylalkyl group such as a benzyl group, various phenylethyl groups, various methylbenzyl groups, etc. Incidentally, each of these $R^4$, $R^5$, and $R^6$ is especially preferably a hydrogen atom or a hydrocarbon group having not more than 3 carbon atoms.

On the other hand, in the general formula (II), $R^7$ represents a divalent hydrocarbon group having from 2 to 10 carbon atoms. Specifically, examples of the divalent hydrocarbon group having from 2 to 10 carbon atoms as referred to herein include a divalent aliphatic hydrocarbon group such as an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, various decylene groups, etc.; an alicyclic hydrocarbon group having two bonding sites on an alicyclic hydrocarbon, such as cyclohexane, methylcyclohexane, ethylcyclohexane, dimethylcyclohexane, propylcyclohexane, etc.; a divalent aromatic hydrocarbon group such as various phenylene groups, various methylphenylene groups, various ethylphenylene groups, various dimethylphenylene groups, various naphthylene groups, etc.; an alkyl aromatic hydrocarbon group having a monovalent bonding site in each of an alkyl group moiety and an aromatic moiety of an alkyl aromatic hydrocarbon such as toluene, ethylbenzene, etc.; an alkyl aromatic hydrocarbon group having a bonding site in an alkyl group moiety of a polyalkyl aromatic hydrocarbon such as xylene, diethylbenzene, and the like. Among these, an aliphatic hydrocarbon group having from 2 to 4 carbon atoms is especially preferable. In addition, the plural $R^7$Os may be the same as or different from each other.

Incidentally, in the general formula (II), p represents a repeating number and is a number ranging from 0 to 10, and preferably from 0 to 5 in terms of an average value thereof.

Furthermore, in the general formula (II), $R^8$ represents a hydrocarbon group having from 1 to 10 carbon atoms. Specifically, examples of this hydrocarbon group include an alkyl group such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, etc.; a cycloalkyl group such as a cyclopentyl group, a cyclohexyl group, various methylcyclohexyl groups, various ethylcyclohexyl groups, various propylcyclohexyl groups, various dimethylcyclohexyl groups, etc.; an aryl group such as a phenyl group, various methylphenyl groups, various ethylphenyl groups, various dimethylphenyl groups, various propylphenyl groups, various trimethylphenyl groups, various butylphenyl groups, various naphthyl groups, etc.; and an arylalkyl group such as a benzyl group, various phenylethyl groups, various methylbenzyl groups, various phenylpropyl groups, various phenylbutyl groups, etc. Among these, a hydrocarbon group having not more than 8 carbon atoms is preferable; and when p is 0, an alkyl group having from 1 to 6 carbon atoms is especially preferable, and when p is 1 or more, an alkyl group having from 1 to 4 carbon atoms is especially preferable.

Among polyvinyl-based compounds having a constituent unit represented by the foregoing general formula (II), a polymer or a copolymer in which the amount of a constituent unit wherein all of $R^4$, $R^5$, and $R^6$ are a hydrogen atom, p is 0, and $R^8$ is an ethyl group is from 50 to 100% by mole, and the amount of a constituent unit wherein all of $R^4$, $R^5$, and $R^6$ are a hydrogen atom, p is 0, and $R^8$ is an alkyl group having 3 or 4 carbon atoms is from 0 to 50% by mole is preferable.

A compound in which the proportion of the constituent unit wherein $R^8$ is an ethyl group is from 70 to 100% by mole is more preferable, and a compound in which the proportion of the constituent unit wherein $R^8$ is an ethyl group is 100% by mole, namely polyethyl vinyl ether, is still more preferable.

In addition, as the alkyl group having 3 or 4 carbon atoms for the above-described $R^8$, an n-propyl group, an isopropyl group, an n-butyl group, an isobutyl group, a sec-butyl group, or a tert-butyl group can be used, with an isobutyl group being especially preferable.

The polyvinyl ether-based compound in the present invention can be produced by polymerizing a corresponding vinyl ether-based monomer. The vinyl ether-based monomer which can be used herein is a compound represented by a general formula (III).

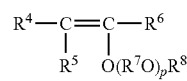
(III)

(In the formula, $R^4$, $R^5$, $R^6$, $R^7$, $R^8$, and p are the same as those described above.)

As this vinyl ether-based monomer, various compounds corresponding to the above-described polyvinyl ether-based compound are exemplified. Examples thereof include vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, vinyl 2-methoxyethyl ether, vinyl 2-ethoxyethyl ether, vinyl 2-methoxy-1-methylethyl ether, vinyl 2-methoxypropyl ether, vinyl 3,6-dioxaheptyl ether, vinyl 3,6,9-trioxadecyl ether, vinyl 1,4-dimethyl-3,6-dioxaheptyl ether, vinyl 1,4,7-trimethyl-3,6,9-trioxadecyl ether, vinyl 2,6-dioxa-4-heptyl ether, vinyl 2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, 2-tert-butoxy-2-butene, and the like. These vinyl ether-based monomers can be produced by a known method.

In the polyvinyl ether-based compound having a constituent unit represented by the foregoing general formula (II), which is used for the refrigerating machine oil composition of the present invention, the terminal thereof can be converted into a desired structure by a method disclosed in this embodiment or a known method. Examples of the group to be converted include a saturated hydrocarbon group, an ether group, an alcohol group, a ketone group, an amide group, a nitrile group, and the like.

Preferred examples of the polyvinyl ether-based compound which is used for the base oil in the refrigerating machine oil composition of the present invention include compounds having the following terminal structures.

(1) A compound having a structure in which one terminal thereof is represented by a general formula (IV), and a remaining terminal thereof is represented by a general formula (V).

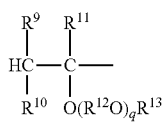

(In the formula, each of $R^9$, $R^{10}$, and $R^{11}$ represents a hydrogen atom or a hydrocarbon group having from 1 to 8 carbon atoms, and they may be the same as or different from each other; $R^{12}$ represents a divalent hydrocarbon group having from 2 to 10 carbon atoms; $R^{13}$ represents a hydrocarbon group having from 1 to 10 carbon atoms; q represents a number of from 0 to 10 in terms of an average value thereof; and when plural $R^{12}$Os are present, the plural $R^{12}$Os may be the same as or different from each other.)

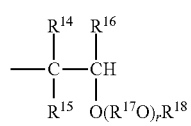

(In the formula, each of $R^{14}$, $R^{15}$, and $R^{16}$ represents a hydrogen atom or a hydrocarbon group having from 1 to 8 carbon atoms, and they may be the same as or different from each other; $R^{17}$ represents a divalent hydrocarbon group having from 2 to 10 carbon atoms; $R^{18}$ represents a hydrocarbon group having from 1 to 10 carbon atoms; r represents a number of from 0 to 10 in terms of an average value thereof; and when plural $R^{17}$Os are present, the plural $R^{17}$Os may be the same as or different from each other.)

(2) A compound having a structure in which one terminal thereof is represented by the foregoing general formula (IV), and a remaining terminal thereof is represented by a general formula (VI).

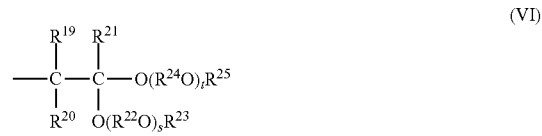

(In the formula, each of $R^{19}$, $R^{20}$, and $R^{21}$ represents a hydrogen atom or a hydrocarbon group having from 1 to 8 carbon atoms, and they may be the same as or different from each other; each of $R^{22}$ and $R^{24}$ represents a divalent hydrocarbon group having from 2 to 10 carbon atoms, and they may be the same as or different from each other; each of $R^{23}$ and $R^{25}$ represents a hydrocarbon group having from 1 to 10 carbon atoms, and they may be the same as or different from each other; each of s and t represents a number of from 0 to 10 in terms of an average value thereof, and they may be the same as or different from each other; when plural $R^{22}$Os are present, the plural $R^{22}$Os may be the same as or different from each other; and when plural $R^{24}$Os are present, the plural $R^{24}$Os may be the same as or different from each other.)

(3) A compound in which one terminal thereof is represented by the foregoing general formula (IV), and a remaining terminal thereof has an olefinically unsaturated bond.

(4) A compound having a structure in which one terminal thereof is represented by the foregoing general formula (IV), and a remaining terminal thereof is represented by a general formula (VII).

(In the formula, each of $R^{26}$, $R^{27}$, and $R^{28}$ represents a hydrogen atom or a hydrocarbon group having from 1 to 8 carbon atoms, and they may be the same as or different from each other.)

The polyvinyl ether-based mixture may be a mixture of two or more kinds selected from the compounds having the foregoing terminal structures (1) to (4). Preferred examples of such a mixture include a mixture of the foregoing compounds (1) and (4) and a mixture of the foregoing compounds (2) and (3).

As for the above-described polyvinyl ether-based compound, it is preferable to select the above-described raw material, initiator, and reaction conditions so as to form a polyvinyl ether-based compound having a preferred viscosity range. Incidentally, even in a polymer having a kinematic eddy viscosity falling outside the foregoing range, it is also possible to adjust the viscosity within the foregoing kinematic eddy viscosity range by mixing it with a polymer having other kinematic eddy viscosity.

Incidentally, on the occasion of producing the polyvinyl ether-based compound in the present invention, it is desirable that after completion of the synthesis reaction, the unreacted raw material is removed, and a treatment for making the hydroxyl group value small as far as possible is applied.

In the present invention, this polyvinyl ether-based compound may be used solely, or it may be used in combination of two or more kinds thereof.

[Copolymer of Poly(Oxy)Alkylene Glycol or Monoether Thereof and Polyvinyl Ether]

Incidentally, the poly(oxy)alkylene glycol refers to both a polyalkylene glycol and a polyoxyalkylene glycol.

In the refrigerating machine oil composition of the present invention, examples of the copolymer of a poly(oxy)alkylene glycol or a monoether thereof and polyvinyl ether, which can be used as the base oil, include copolymers represented by a general formula (VIII) and a general formula (IX) (hereinafter referred to as "polyvinyl ether-based copolymer I" and "polyvinyl ether-based copolymer II", respectively).

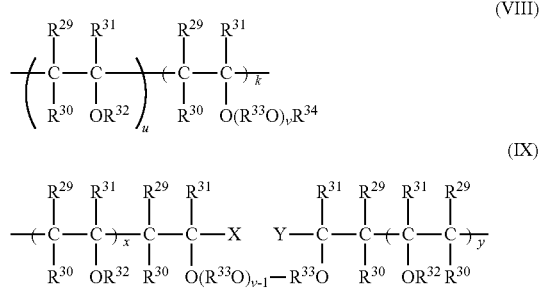

In the foregoing general formula (VIII), each of $R^{29}$, $R^{30}$, and $R^{31}$ represents a hydrogen atom or a hydrocarbon group having from 1 to 8 carbon atoms, and they may be the same as or different from each other; $R^{33}$ represents a divalent hydrocarbon group having from 2 to 4 carbon atoms; $R^{34}$ represents an aliphatic or alicyclic hydrocarbon group having from 1 to 20 carbon atoms, an aromatic hydrocarbon group which may have a substituent having from 1 to 20 carbon atoms, an acyl group having from 2 to 20 carbon atoms, or an oxygen-containing hydrocarbon group having from 2 to 50 carbon atoms; $R^{32}$ represents a hydrocarbon group having from 1 to 10 carbon atoms; and when plural groups represented by each of $R^{34}$, $R^{33}$, and $R^{32}$ are present, they may be the same as or different from each other.

Specifically, examples of the hydrocarbon group having from 1 to 8 carbon atoms for $R^{29}$ to $R^{31}$ as referred to herein include an alkyl group such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, etc.; a cyclopentyl group, a cyclohexyl group, various methylcyclohexyl groups, various ethylcyclohexyl groups, various dimethylcyclohexyl groups, an aryl group such as various dimethylphenyl groups, etc.; and an arylalkyl group such as a benzyl group, various phenylethyl groups, various methylbenzyl groups, etc. Incidentally each of these $R^{29}$, $R^{30}$, and $R^{31}$ is especially preferably a hydrogen atom.

On the other hand, specifically, examples of the divalent hydrocarbon group having from 2 to 4 carbon atoms represented by $R^{33}$ include a divalent alkylene group such as a methylene group, an ethylene group, a propylene group, a trimethylene group, various butylene groups, etc.

Incidentally, in the general formula (VIII), v represents a repeating number of $R^{33}O$ and is a number ranging from 1 to 50, preferably from 1 to 20, more preferably from 1 to 10, and especially preferably from 1 to 5 in terms of an average value thereof. When plural $R^{33}Os$ are present, the plural $R^{33}Os$ may be the same as or different from each other.

In addition, k represents a number of from 1 to 50, preferably from 1 to 10, more preferably from 1 to 2, and especially preferably 1; u represents a number of from 0 to 50, preferably from 2 to 25, and more preferably from 5 to 15; and when a plurality of each of k and u are present, they may be in a block form or a random form, respectively.

Furthermore, in the general formula (VIII), $R^{34}$ preferably represents an alkyl group having from 1 to 10 carbon atoms, an acyl group having from 2 to 10 carbon atoms, or an oxygen-containing hydrocarbon group having from 2 to 50 carbon atoms.

Specifically, examples of this alkyl group having from 1 to 10 carbon atoms include a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methylcyclohexyl groups, various ethylcyclohexyl groups, various propylcyclohexyl groups, various dimethylcyclohexyl groups, and the like.

In addition, examples of the acyl group having from 2 to 10 carbon atoms include an acetyl group, a propionyl group, a butyryl group, an isobutyryl group, a valeryl group, an isovaleryl group, a pivaloyl group, a benzoyl group, a toluoyl group, and the like.

Furthermore, specifically, preferred examples of the oxygen-containing hydrocarbon group having from 2 to 50 carbon atoms include a methoxymethyl group, a methoxyethyl group, a methoxypropyl group, a 1,1-bismethoxypropyl group, 1,2-bismethoxypropyl group, an ethoxypropyl group, a (2-methoxyethoxy) propyl group, a (1-methyl-2-methoxy)propyl group, and the like.

In the general formula (VIII), specifically, examples of the hydrocarbon group having from 1 to 10 carbon atoms represented by $R^{32}$ include an alkyl group such as a methyl group, an ethyl group, an n-propyl group, an isopropyl group, an n-butyl group, an isobutyl group, various pentyl groups, various hexyl groups, various heptyl groups, various octyl groups, various nonyl groups, various decyl groups, etc.; a cycloalkyl group such as a cyclopentyl group, a cyclohexyl group, various methylcyclohexyl groups, various ethylcyclohexyl groups, various propylcyclohexyl groups, various dimethylcyclohexyl groups, etc.; an aryl group such as a phenyl group, various methylphenyl groups, various ethylphenyl groups, various dimethylphenyl groups, various propylphenyl groups, various trimethylphenyl groups, various butylphenyl groups, various naphthyl groups, etc.; an arylalkyl group such as a benzyl group, various phenylethyl groups, various methylbenzyl groups, various phenylpropyl groups, various phenylbutyl groups, etc.; and the like.

Incidentally, $R^{29}$ to $R^{31}$, $R^{34}$, $R^{33}$, v, and $R^{29}$ to $R^{32}$ may be the same as or different from each other for every constituent unit.

The polyvinyl ether-based copolymer I having a constituent unit represented by the foregoing general formula (VIII)

has effects capable of enhancing lubricating properties, insulating properties, hygroscopicity, and the like while satisfying compatibility upon being formed in a copolymer. On that occasion, by selecting the kinds of the monomers serving as raw materials, the kind of the initiator, and the ratio of the copolymer, it becomes possible to adapt the above-described performances of the oil to the desired levels. In consequence, there is brought an effect for freely obtaining an oil in conformity with demands such as lubricating properties, compatibility, etc., which vary depending upon the type of a compressor in a refrigerating system or an air conditioning system, the material quality of a lubricating part, refrigeration capability, the kind of a refrigerant, and the like.

On the other hand, in the polyvinyl ether-based copolymer II represented by the foregoing general formula (IX), $R^{29}$ to $R^{32}$, $R^{33}$, and v are the same as those described above. When plural groups represented by each of $R^{33}$ and $R^{32}$ are present, they may be the same as or different from each other. Each of x and y represents a number of from 1 to 50; and when a plurality of each of x and y are present, they may be in a block form or a random form, respectively. Each of X and Y independently represents a hydrogen atom, a hydroxyl group, or a hydrocarbon group having from 1 to 20 carbon atoms.

Though a production method of the polyvinyl ether-based copolymer I represented by the foregoing general formula (VIII) is not particularly limited so long as the polyvinyl ether-based copolymer I can be obtained, examples thereof include the following production methods 1 to 3.

(Production Method 1 of Polyvinyl Ether-Based Copolymer I)

In this production method 1, the polyvinyl ether-based copolymer I can be obtained by using, as an initiator, a poly(oxy)alkylene glycol compound represented by a general formula (X):

(in the formula, $R^{33}$, $R^{34}$, and v are the same as those described above) and polymerizing a vinyl ether-based compound represented by a general formula (XI).

(In the formula, $R^{29}$ to $R^{32}$ are the same as those described above.)

Examples of the poly(oxy)alkylene glycol compound represented by the foregoing formula (X) include an (oxy)alkylene glycol monoether such as ethylene glycol monomethyl ether, diethylene glycol monomethyl ether, triethylene glycol monomethyl ether, propylene glycol monomethyl ether, dipropylene glycol monomethyl ether, tripropylene glycol monomethyl ether, etc.

In addition, examples of the vinyl ether-based compound represented by the foregoing general formula (XI) include a vinyl ether such as vinyl methyl ether, vinyl ethyl ether, vinyl n-propyl ether, vinyl isopropyl ether, vinyl n-butyl ether, vinyl isobutyl ether, vinyl sec-butyl ether, vinyl tert-butyl ether, vinyl n-pentyl ether, vinyl n-hexyl ether, etc.; a propene such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, etc.; and a butene such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-tert-butoxy-2-butene, etc. Such a vinyl ether-based monomer can be produced by a known method.

(Production Method 2 of Polyvinyl Ether-Based Copolymer I)

In this production method 2, the polyvinyl ether-based copolymer I can be obtained by using, as an initiator, an acetal compound represented by a general formula (XII) and polymerizing the vinyl ether-based compound represented by the foregoing general formula (XI).

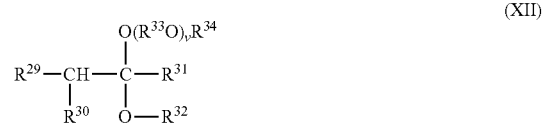

(In the formula, $R^{29}$ to $R^{34}$ and v are the same as those described above.)

Examples of the acetal compound represented by the foregoing general formula (XII) include acetaldehyde methyl(2-methoxyethyl)acetal, acetaldehyde ethyl(2-methoxyethyl)acetal, acetaldehyde methyl(2-methoxy-1-methylethyl)acetal, acetaldehyde ethyl(2-methoxy-1-methylethyl)acetal, acetaldehyde methyl[2-(2-methoxyethyoxy)ethyl]acetal, acetaldehyde ethyl[2-(2-methoxyethyoxy)ethyl]acetal, acetaldehyde methyl[2-(2-methoxyethoxy)-1-methylethyl]acetal, acetaldehyde ethyl[2-(2-methoxyethoxy)-1-methylethyl]acetal, and the like.

In addition, the acetal compound represented by the foregoing general formula (XII) can also be produced, for example, by allowing one molecule of the poly(oxy)alkylene glycol compound represented by the foregoing general formula (X) to react with one molecule of the vinyl ether-based compound represented by the foregoing general formula (XI). The resulting acetal compound can be used as the initiator after it is isolated or as it is.

(Production Method 3 of Polyvinyl Ether-Based Copolymer I)

In this production method 3, the polyvinyl ether-based copolymer I can be obtained by using, as an initiator, an acetal compound represented by a general formula (XIII) and polymerizing the vinyl ether-based compound represented by the foregoing general formula (XI).

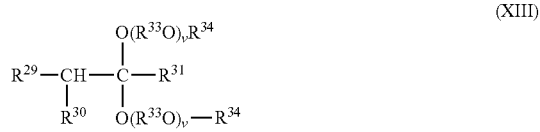

(In the formula, $R^{29}$ to $R^{31}$, $R^{33}$, $R^{34}$, and v are the same as those described above.)

Examples of the acetal compound represented by the foregoing general formula (XIII) include acetaldehyde di(2-methoxyethyl)acetal, acetaldehyde di(2-methoxy-1-methylethyl)acetal, acetaldehyde di[2-(2-methoxyethyoxy)ethyl]acetal, acetaldehyde di[2-(2-methoxyethoxy)-1-methylethyl]acetal, and the like.

In addition, the acetal compound represented by the foregoing general formula (XIII) can also be produced, for example, by allowing one molecule of the poly(oxy)alkylene glycol compound represented by the foregoing general formula (X) to react with one molecule of the vinyl ether-based compound represented by a general formula (XIV). The resulting acetal compound can be used as the initiator after it is isolated or as it is.

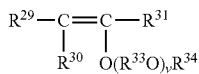
(XIV)

(In the formula, $R^{29}$ to $R^{31}$, $R^{33}$, $R^{34}$, and v are the same as those described above.)

The vinyl ether-based copolymer I represented by the general formula (VIII) can be formed into a polyvinyl ether-based copolymer I having a structure in which one terminal thereof is represented by a general formula (XV) or (XVI), and a remaining terminal thereof is represented by a general formula (XVII) or a general formula (XVIII).

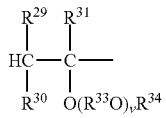
(XV)

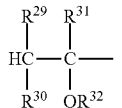
(XVI)

(In the formulae, $R^{29}$ to $R^{34}$ and v are the same as those described above.)

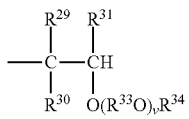
(XVII)

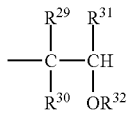
(XVIII)

(In the formulae, $R^{29}$ to $R^{34}$ and v are the same as those described above.)

Among such polyvinyl ether-based copolymers I, those exemplified below are especially preferable as the base oil of the refrigerant machine oil composition of the present invention.

(1) A copolymer having a structure in which one terminal thereof is represented by the general formula (XV) or (XVI), and a remaining terminal thereof is represented by the general formula (XVII) or (XVIII), wherein in the general formula (VIII), each of $R^{29}$, $R^{30}$, and $R^{31}$ represents a hydrogen atom; v represents a number of from 1 to 4; $R^{33}$ represents a divalent hydrocarbon group having from 2 to 4 carbon atoms; $R^{34}$ represents an alkyl group having from 1 to 10 carbon atoms; and $R^{32}$ represents a hydrocarbon group having from 1 to 10 carbon atoms.

(2) A copolymer having a structure in which one terminal thereof is represented by the general formula (XV), and a remaining terminal thereof is represented by the general formula (XVIII), wherein in the general formula (VIII), each of $R^{29}$, $R^{30}$, and $R^{31}$ represents a hydrogen atom; v represents a number of from 1 to 4; $R^{33}$ represents a divalent hydrocarbon group having from 2 to 4 carbon atoms; $R^{34}$ represents an alkyl group having from 1 to 10 carbon atoms; and $R^{32}$ represents a hydrocarbon group having from 1 to 10 carbon atoms.

(3) A copolymer having a structure in which one terminal thereof is represented by the general formula (XVI), and a remaining terminal thereof is represented by the general formula (XVII), wherein in the general formula (VIII), each of $R^{29}$, $R^{30}$, and $R^{31}$ represents a hydrogen atom; v represents a number of from 1 to 4; $R^{33}$ represents a divalent hydrocarbon group having from 2 to 4 carbon atoms; $R^{34}$ represents an alkyl group having from 1 to 10 carbon atoms; and $R^{32}$ represents a hydrocarbon group having from 1 to 10 carbon atoms.

On the other hand, though a production method of the polyvinyl ether-based copolymer II represented by the foregoing general formula (IX) is not particularly limited so long as the polyvinyl ether-based copolymer II can be obtained, the polyvinyl ether-based copolymer II can be efficiently produced by the following method.

(Production Method of Polyvinyl Ether-Based Copolymer II)

The polyvinyl ether-based copolymer II represented by the foregoing general formula (IX) can be obtained by using, as an initiator, a poly(oxy)alkylene glycol represented by a general formula (XIX):

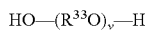
(XIX)

(in the formula, $R^{33}$ and v are the same as those described above) and polymerizing the vinyl ether compound represented by the foregoing general formula (XI).

Examples of the poly(oxy)alkylene glycol represented by the foregoing general formula (XIX) include ethylene glycol, diethylene glycol, triethylene glycol, polyethylene glycol, propylene glycol, dipropylene glycol, polypropylene glycol, and the like.

In the present invention, this copolymer of a poly(oxy)alkylene glycol or a monoether thereof and a polyvinyl ether may be used solely, or it may be used in combination of two or more kinds thereof.

[Polyol Ester]

In the refrigerating machine oil composition of the present invention, an ester of a diol or a polyol having from about 3 to 20 hydroxyl groups and a fatty acid having from about 1 to 24 carbon atoms is preferably used as the polyol ester which can be used as the base oil.

Here, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol, and the like.

Examples of the above-described polyol include a polyhydric alcohol such as trimethylolethane, trimethylolpropane, trimethylolbutane, di(trimethylolpropane), tri(trimethylolpropane), pentaerythritol, di(pentaerythritol), tri(pentaerythritol), glycerin, polyglycerin (dimer to eicosamer of glycerin), 1,3,5-pentanetriol, sorbitol, sorbitan, a sorbitol-glycerin condensate, adonitol, arabitol, xylitol, mannitol, etc.; a saccharide such as xylose, arabinose, ribose, rhamnose, glucose, fructose, galactose, mannose, sorbose, cellobiose, maltose, isomaltose, trehalose, sucrose, raffinose, gentianose, melezitose, etc.; partially etherified products and methyl glucosides thereof; and the like. Among these, a hindered alcohol such as neopentyl glycol, trimethylolethane, trimethylolpropane, trimethylolbutane, di(trimethylolpropane), tri(trimethylolpropane), pentaerythritol, di(pentaerythritol), tri(pentaerythritol), etc. is preferable as the polyol.

Though the fatty acid is not particularly limited on its carbon number, in general, a fatty acid having from 1 to 24 carbon atoms is used. In the fatty acid having from 1 to 24 carbon atoms, a fatty acid having 3 or more carbon atoms is preferable, a fatty acid having 4 or more carbon atoms is more preferable, a fatty acid having 5 or more carbon atoms is still more preferable, and a fatty acid having 10 or more carbon atoms is the most preferable from the standpoint of lubricating properties. In addition, a fatty acid having not more than 18 carbon atoms is preferable, a fatty acid having not more than 12 carbon atoms is more preferable, and a fatty acid having not more than 9 carbon atoms is still more preferable from the standpoint of compatibility with the refrigerant.

In addition, the fatty acid may be either of a linear fatty acid and a branched fatty acid, and the fatty acid is preferably a linear fatty acid from the standpoint of lubricating properties, whereas it is preferably a branched fatty acid from the standpoint of hydrolysis stability. Furthermore, the fatty acid may be either of a saturated fatty acid and an unsaturated fatty acid.

Specifically, examples of the above-described fatty acid include a linear or branched fatty acid such as pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, oleic acid, etc.; a so-called neo acid in which an α-carbon atom thereof is quaternary; and the like. More specifically, preferred examples thereof include valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like.

Incidentally, the polyol ester may be a partial ester in which the hydroxyl groups of the polyol remain without being fully esterified; a complete ester in which all of the hydroxyl groups are esterified; or a mixture of a partial ester and a complete ester, with a complete ester being preferable.

In the polyol ester, an ester of a hindered alcohol such as neopentyl glycol, trimethylolethane, trimethylolpropane, trimethylolbutane, di(trimethylolpropane), tri(trimethylolpropane), pentaerythritol, di(pentaerythritol), tri(pentaerythritol), etc. is more preferable, with an ester of neopentyl glycol, trimethylolethane, trimethylolpropane, trimethylolbutane, or pentaerythritol being still more preferable, from the standpoint of more excellent hydrolysis stability; and an ester of pentaerythritol is the most preferable from the standpoint of especially excellent compatibility with the refrigerant and hydrolysis stability.

Preferred specific examples of the polyol ester include a diester of neopentyl glycol with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

Incidentally, the ester with two or more kinds of fatty acids may be a mixture of two or more kinds of esters of one kind of a fatty acid and a polyol, and an ester of a mixed fatty acid of two or more kinds thereof and a polyol, particularly an ester of a mixed fatty acid and a polyol is excellent in low-temperature properties and compatibility with the refrigerant.

In addition, this base oil preferably has an ASTM color of not more than 1, a surface tension of 20 mN/m or more, a pH of extracted water of 5.5 or more, an ash content of not more than 0.1% by mass, and a volume resistivity value of $10^9$ Ωm or more. The base oil having such properties has good stability and excellent electric insulating properties, and thus, it is preferable.

On the occasion of producing the polyol ester-based compound, coloration can be suppressed by conducting the esterification reaction in an inert gas atmosphere. In addition, with respect to a proportion of a polyhydric alcohol and an aliphatic monocarboxylic acid which are allowed to react with each other, in the case where the amount of the aliphatic monocarboxylic acid is smaller than a stoichiometric amount, the hydroxyl group remains, and the hydroxyl group value increases. On the other hand, in the case where the amount of the aliphatic monocarboxylic acid is larger than a stoichiometric amount, not only the carboxylic acid remains, and the acid value increases, but the pH of extracted water is lowered. In consequence, it is desirable to optimize a molar ratio of the polyhydric alcohol and the aliphatic monocarboxylic acid. In addition, it is desirable to apply a treatment such that the amount of the remaining esterification catalyst (ash content) is made small as far as possible.

As the base oil in the refrigerating machine oil composition of the present invention, a base oil which is composed of an oxygen-containing compound composed of at least one member selected from a polyoxyalkylene glycol, a polyvinyl ether, a copolymer of a poly(oxy)alkylene glycol or a monoether thereof and a polyvinyl ether, and a polyol ester as described above is used.

Of these, the polyvinyl ether is especially preferably used from the standpoint of excellent compatibility with the refrigerant or volume resistivity.

In the present invention, the kinematic viscosity at 100° C. of the base oil is preferably 1 mm²/s or more and not more than 50 mm²/s, more preferably 3 mm²/s or more and not more than 40 mm²/s, still more preferably 4 mm²/s or more and not more than 30 mm²/s, and especially preferably 5 mm²/s or more and not more than 20 mm²/s. When the kinematic viscosity is 1 mm²/s or more, not only a good lubricating performance (load bearing properties) is revealed, but sealing properties are good, whereas when it is not more than 50 mm²/s, energy saving properties are good.

In addition, a number average molecular weight of the base oil is preferably 300 or more and not more than 3,000, more preferably 500 or more and not more than 3,000, and still more preferably 700 or more and not more than 2,500. A flash point of the base oil is preferably 150° C. or higher, and when the number average molecular weight of the base oil is 300 or more and not more than 3,000, not only the desired performance as a refrigerating machine oil can be revealed, but the flash point of the base oil can be made to fall within the foregoing range.

In addition, a viscosity index of the base oil in the present invention is preferably 60 or more, and more preferably 80 or more. However, an upper limit of the viscosity index is about 300 due to a restriction on the production or the like.

When the above-described viscosity index is 60 or more, a lowering of the kinematic eddy viscosity at a high temperature can be suppressed.

Incidentally, the viscosity index of the above-described base oil is measured according to JIS K2283.

<Refrigerant>

As the refrigerant to which the lubricating oil composition for compression refrigerating machine of the present invention is applied, a refrigerant containing a saturated fluorinated hydrocarbon compound (HFC) having from 1 to 3 carbon atoms, and preferably from 1 to 2 carbon atoms is used.

Preferred examples of the saturated fluorinated hydrocarbon compound having from 1 to 3 carbon atoms include trifluoromethane, difluoromethane, 1,1-di fluoroethane, 1,1,1-trifluoroethane, 1,1,2-trifluoroethane, 1,1,1,2-tetrafluoroethane, 1,1,2,2-tetrafluoroethane, 1,1,1,2,2-pentafluoroethane, and 1,1,1,3,3-pentafluoropropane.

Such a refrigerant may be used solely, or it may be used in admixture of two or more kinds thereof.

For example, in the case of using difluoromethane (R32) as the saturated fluorinated hydrocarbon compound, though it is preferable to use R32 solely, R32 may be mixed with 1,1,1,2,2-pentafluoroethane (R125), or R32 may be mixed with R125 and 1,1,1,2-tetrafluoroethane (R134a). Representative examples of the former include R410A, and representative examples of the latter include R407C.

In the case of using a mixture of R32 with other saturated fluorinated hydrocarbon compound having from 1 to 3 carbon atoms, a proportion of R32 in the whole of the refrigerant is preferably 20% by mass or more, more preferably 40% by mass or more, and still more preferably 70% by mass or more.

Furthermore, the above-described saturated fluorinated hydrocarbon compound having from 1 to 3 carbon atoms may be mixed with a refrigerant other than the saturated fluorinated hydrocarbon compound having from 1 to 3 carbon atoms to be used. In that case, a mixing proportion of the refrigerant other than the saturated fluorinated hydrocarbon compound having from 1 to 3 carbon atoms is preferably not more than 30% by mass, and more preferably not more than 20% by mass of the whole of the refrigerant.

Examples of the refrigerant other than the saturated fluorinated hydrocarbon compound having from 1 to 3 carbon atoms include carbon dioxide ($CO_2$), low-boiling point hydrocarbon (HC), ammonia, and at least one fluorine-containing organic compound selected from compounds represented by the following molecular formula (A).

$$C_pO_qF_rR_s \qquad (A)$$

(In the formula, R represents Cl, Br, I, or H; p represents an integer of from 1 to 6; q represents an integer of from 0 to 2; r represents an integer of from 1 to 14; and s represents an integer of from 0 to 13, provided that when q is 0, then p is from 2 to 6, and one or more carbon-carbon unsaturated bonds are present in the molecule.)

The refrigerant represented by the foregoing molecular formula (A) is hereunder described in detail.

The molecular formula (A) shows the kinds and the numbers of the elements in the molecule, and the formula (A) represents a fluorine-containing organic compound having the number p of carbon atoms C of from 1 to 6. So far as a fluorine-containing organic compound having from 1 to 6 carbon atoms is concerned, it can have physical and chemical properties including a boiling point, a freezing point, an evaporation latent heat, and the like, which are demanded for the refrigerant.

In the molecular formula (A), examples of the bonding mode of the p carbon atoms represented by $C_p$ include a carbon-carbon single bond, an unsaturated bond such as a carbon-carbon double bond, etc., a carbon-oxygen double bond, and the like. The carbon-carbon unsaturated bond is preferably a carbon-carbon double bond from the standpoint of stability, and though the number thereof is 1 or more, it is preferably 1.

In addition, in the molecular formula (A), the bonding mode of the q oxygen atoms represented by $O_q$ is preferably oxygen derived from an ether group, a hydroxyl group, or a carbonyl group. The number q of the oxygen atoms may be 2, and there is also included the case where two ether groups or hydroxyl groups or the like are contained.

In addition, in the case where q in $O_q$ is 0, i.e., no oxygen atom is contained in the molecule, p is from 2 to 6, and one or more unsaturated bonds such as a carbon-carbon double bond, etc. are contained in the molecule. That is, at least one of the bonding modes of the p carbon atoms represented by $C_p$ is required to be a carbon-carbon unsaturated bond.

In addition, in the molecular formula (A), R represents Cl, Br, I, or H and may be any of them. However, R is preferably H in view of the fact that there is a less concern about destruction of the ozone layer.

As described above, preferred examples of the fluorine-containing organic compound represented by the molecular formula (A) include an unsaturated fluorinated hydrocarbon compound, a fluorinated ether compound, a fluorinated alcohol compound, a fluorinated ketone compound, and the like.

These compounds are hereunder described.

[Unsaturated Fluorinated Hydrocarbon Compound]

In the present invention, examples of the unsaturated fluorinated hydrocarbon compound which is used as the refrigerant of the refrigerating machine include an unsaturated fluorinated hydrocarbon compound represented by the molecular formula (A), wherein R is H, p is from 2 to 6, q is 0, r is from 1 to 12, and s is from 0 to 11.

Preferred examples of such an unsaturated fluorinated hydrocarbon compound include fluorides of a linear or branched olefin having from 2 to 6 carbon atoms or a cyclic olefin having from 4 to 6 carbon atoms.

Specifically, examples thereof include an ethylene having from 1 to 3 fluorine atoms introduced thereinto, a propene having from 1 to 5 fluorine atoms introduced thereinto, a butene having from 1 to 7 fluorine atoms introduced thereinto, a pentene having from 1 to 9 fluorine atoms introduced thereinto, a hexene having from 1 to 11 fluorine atoms introduced thereinto, a cyclobutene having from 1 to 5 fluorine atoms introduced thereinto, a cyclopentene having from 1 to 7 fluorine atoms introduced thereinto, a cyclohexene having from 1 to 9 fluorine atoms introduced thereinto, and the like.

Among these unsaturated fluorinated hydrocarbon compounds, an unsaturated fluorinated hydrocarbon compound having from 2 to 3 carbon atoms is preferable, and examples thereof include a fluoride of ethylene such as trifluoroethylene, etc., and a fluoride of propene of every kind, with a fluoride of propene being more preferable. Examples of this fluoride of propene include 3,3,3-trifluoropropene, 1,3,3,3-tetrafluoropropene, 2,3,3,3-tetrafluoropropene, and the like. In particular, 1,2,3,3,3-pentafluoropropene (HFO1225ye), 1,3,3,3-tetrafluoropropene (HFO1234ze), and 2,3,3,3-tetrafluoropropene (HFO1234yf) are preferable from the standpoint of a low global warming potential thereof.

In the present invention, this unsaturated fluorinated hydrocarbon compound may be used solely, or it may be used in combination of two or more kinds thereof.

[Fluorinated Ether Compound]

In the present invention, examples of the fluorinated ether compound which is used as the refrigerant of the refrigerating machine include a fluorinated ether compound represented by the molecular formula (A), wherein R is H, p is from 2 to 6, q is from 1 to 2, r is from 1 to 14, and s is from 0 to 13.

Preferred examples of such a fluorinated ether compound include a fluoride of an aliphatic ether with a linear or branched alkyl group having from 2 to 6 carbon atoms and from 1 to 2 ether bonds; and a fluoride of a cyclic aliphatic ether having from 3 to 6 carbon atoms and from 1 to 2 ether bonds.

Specifically, examples thereof include a fluorinated dimethyl ether having from 1 to 6 fluorine atoms introduced thereinto, a fluorinated methyl ethyl ether having from 1 to fluorine atoms introduced thereinto, a fluorinated dimethoxymethane having from 1 to 8 fluorine atoms introduced thereinto, a fluorinated methyl propyl ether having from 1 to 10 fluorine atoms introduced thereinto, a fluorinated methyl butyl ether having from 1 to 12 fluorine atoms introduced thereinto, a fluorinated ethyl propyl ether having from 1 to 12 fluorine atoms introduced thereinto, a fluorinated oxetane having from 1 to 6 fluorine atoms introduced thereinto, a fluorinated 1,3-dioxolane having from 1 to 6 fluorine atoms introduced thereinto, a fluorinated tetrahydrofuran having from 1 to 8 fluorine atoms introduced thereinto, and the like.

Examples of such a fluorinated ether compound include hexafluorodimethyl ether, pentafluorodimethyl ether, bis(difluoromethyl)ether, fluoromethyl trifluoromethyl ether, trifluoromethyl methyl ether, perfluorodimethoxymethane, 1-trifluoromethoxy-1,1,2,2-tetrafluoroethane, di fluoromethoxypentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolane, various isomers of pentafluorooxetane, various isomers of tetrafluorooxetane, and the like.

In the present invention, this fluorinated ether compound may be used solely, or it may be used in combination of two or more kinds thereof.

[Fluorinated Alcohol Compound]

In the present invention, examples of the fluorinated alcohol compound which is used as the refrigerant of the refrigerating machine include a fluorinated ether compound represented by the molecular formula (A), wherein R is H, p is from 1 to 6, q is from 1 to 2, r is from 1 to 13, and s is from 1 to 13.

Preferred examples of such a fluorinated alcohol compound include a fluoride of a linear or branched aliphatic alcohol having from 1 to 6 carbon atoms and from 1 to 2 hydroxyl groups.

Specifically, examples thereof include a fluorinated methyl alcohol having from 1 to 3 fluorine atoms introduced thereinto, a fluorinated ethyl alcohol having from 1 to 5 fluorine atoms introduced thereinto, a fluorinated propyl alcohol having from 1 to 7 fluorine atoms introduced thereinto, a fluorinated butyl alcohol having from 1 to 9 fluorine atoms introduced thereinto, a fluorinated pentyl alcohol having from 1 to 11 fluorine atoms introduced thereinto, a fluorinated ethylene glycol having from 1 to 4 fluorine atoms introduced thereinto, a fluorinated propylene glycol having from 1 to 6 fluorine atoms introduced thereinto, and the like.

Examples of such a fluorinated alcohol compound include a fluorinated alcohol such as monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, various isomers of octafluorobutyl alcohol, etc.; nonafluorobutyl alcohol, various isomers of difluoroethylene glycol, trifluoroethylene glycol, tetrafluoroethylene glycol; a fluorinated propylene glycol such as various isomers of difluoropropylene glycol, various isomers of trifluoropropylene glycol, various isomers of tetrafluoropropylene glycol, various isomers of pentafluoropropylene glycol, hexafluoropropylene glycol, etc.; a fluorinated trimethylene glycol corresponding to the fluorinated propylene glycol; and the like.

In the present invention, such a fluorinated alcohol compound may be used solely, or it may be used in combination of two or more kinds thereof.

[Fluorinated Ketone Compound]

In the present invention, examples of the fluorinated ketone compound which is used as the refrigerant of the refrigerating machine include a fluorinated ketone compound represented by the molecular formula (A), wherein R is H, p is from 2 to 6, q is from 1 to 2, r is from 1 to 12, and s is from 0 to 11.

Preferred examples of such a fluorinated ketone compound include a fluoride of an aliphatic ketone with a linear or branched alkyl group having from 3 to 6 carbon atoms.

Specifically, examples thereof include a fluorinated acetone having from 1 to 6 fluorine atoms introduced thereinto, a fluorinated methyl ethyl ketone having from 1 to 8 fluorine atoms introduced thereinto, a fluorinated diethyl ketone having from 1 to 10 fluorine atoms introduced thereinto, a fluorinated methyl propyl ketone having from 1 to 10 fluorine atoms introduced thereinto, and the like.

Examples of such a fluorinated ketone compound include hexafluorodimethyl ketone, pentafluorodimethyl ketone, bis(difluoromethyl) ketone, fluoromethyl trifluoromethyl ketone, trifluoromethyl methyl ketone, perfluoromethyl ethyl ketone, trifluoromethyl 1,1,2,2-tetrafluoroethyl ketone, difluoromethyl pentafluoroethyl ketone, trifluoromethyl 1,1,2,2-tetrafluoroethyl ketone, difluoromethyl 1,1,2,2-tetrafluoroethyl ketone, difluoromethyl 1,2,2,2-tetrafluoroethyl ketone, trifluoromethyl 2,2,2-trifluoroethyl ketone, difluoromethyl 2,2,2-trifluoroethyl ketone, and the like.

In the present invention, such a fluorinated ketone compound may be used solely, or it may be used in combination of two or more kinds thereof.

[Other Additives]

The refrigerating machine oil composition of the present invention preferably contains an antioxidant or an acid scavenger. In addition, at least one member of additives selected from an extreme pressure agent, an oiliness agent, a metal deactivator, a defoaming agent, and the like can be further contained.

(Antioxidant)

As the antioxidant, a phenol-based antioxidant such as 2,6-di-tert-butyl-4-methylphenol, 2,6-di-tert-butyl-4-ethylphenol, 2,2'-methylenebis(4-methyl-6-tert-butylphenol), etc., or an amine-based antioxidant such as phenyl-α-naphthylamine, N,N'-diphenyl-p-phenylenediamine, etc. is preferably blended. The antioxidant is added in an amount of preferably from 0.01 to 5% by mass, and more preferably from 0.05 to 3% by mass in the composition from the standpoints of effects, economy, and the like.

(Acid scavenger)

Examples of the acid scavenger include an epoxy compound such as phenyl glycidyl ether, an alkyl glycidyl ether, an alkylene glycol glycidyl ether, cyclohexene oxide, an α-olefin oxide, an epoxidized soybean oil, etc. In particular, at least one member selected from a glycidyl ester, a glycidyl ether, and an α-olefin oxide is preferably used as the acid scavenger.

Examples of the glycidyl ether include a glycidyl ether derived from a linear, branched or cyclic, saturated or unsaturated aliphatic monohydric or polyhydric alcohol having generally from 3 to 30 carbon atoms, preferably from 4 to 24 carbon atoms, and more preferably from 6 to 16 carbon atoms, or an aromatic compound containing one or more hydroxyl groups. In the case of an aliphatic polyhydric alcohol or an aromatic compound containing two or more hydroxyl groups, it is preferable that all of the hydroxyl groups are converted into a glycidyl ether from the viewpoint of suppressing an increase of the hydroxyl value for stability of the lubricating oil composition.

Among these, a glycidyl ether derived from a linear, branched or cyclic, saturated aliphatic monohydric alcohol having from 6 to 16 carbon atoms is especially preferable. Examples of such a glycidyl ether include 2-ethylethyl glycidyl ether, isononyl glycidyl ether, caprinoyl glycidyl ether, lauryl glycidyl ether, myristyl glycidyl ether, and the like.

On the other hand, as the α-olefin oxide, an α-olefin oxide having a carbon number of generally from 4 to 50, preferably from 4 to 24, and more preferably from 6 to 16 is used.

In the present invention, the above-described acid scavenger may be used solely, or it may be used in combination of two or more kinds thereof. In addition, an adding amount thereof is in the range of usually from 0.005 to 10% by mass, and especially preferably from 0.05 to 6% by mass on the basis of a total amount of the composition from the standpoints of effects and suppression of sludge generation.

(Extreme Pressure Agent)

Examples of the extreme pressure agent include a phosphorus extreme pressure agent such as a phosphate ester, an acidic phosphate ester, a phosphite ester, an acidic phosphite ester, and amine salts thereof, etc.

In such a phosphorus extreme pressure agent, tricresyl phosphate, trithiophenyl phosphate, tri(nonylphenyl) phosphite, dioleyl hydrogenphosphite, 2-ethylhexyldiphenyl phosphite, and the like are especially preferable from the standpoints of extreme pressure properties, friction properties, and the like.

In addition, examples of the extreme pressure agent include a metal salt of a carboxylic acid. The metal salt of a carboxylic acid as referred to herein is preferably a metal salt of a carboxylic acid having from 3 to 60 carbon atoms, and more preferably a metal salt of a fatty acid having from 3 to 30 carbon atoms, and especially preferably from 12 to 30 carbon atoms. In addition, examples thereof include metal salts of a dimer acid or a trimer acid of the above-described fatty acid, and a dicarboxylic acid having from 3 to 30 carbon atoms. Among these, metal salts of a fatty acid having from 12 to 30 carbon atoms and a dicarboxylic acid having from 3 to 30 carbon atoms are especially preferable.

On the other hand, the metal constituting the metal salt is preferably an alkali metal or an alkaline earth metal, and in particular, an alkali metal is optimum.

In addition, examples of the extreme pressure agent further include, in addition to the above-described extreme pressure agents, a sulfur extreme pressure agent such as sulfurized fats and oils, a sulfurized fatty acid, a sulfurized ester, a sulfurized olefin, a dihydrocarbyl polysulfide, a thiocarbamate, a thioterpene, a dialkyl thiodipropionate, etc.

An adding amount of the above-described extreme pressure agent is in the range of preferably from 0.001 to 5% by mass, and more preferably from 0.005 to 3% by mass on the basis of a total amount of the composition from the standpoints of lubricating properties and stability. The above-described extreme pressure agent may be used solely, or it may be used in combination of two or more kinds thereof.

(Oiliness Agent)

Examples of the oiliness agent include an aliphatic saturated or unsaturated monocarboxylic acid such as stearic acid, oleic acid, etc.; a polymerized fatty acid such as a dimer acid, a hydrogenated dimer acid, etc.; a hydroxy fatty acid such as ricinoleic acid, 12-hydroxystearic acid, etc.; an aliphatic saturated or unsaturated monoalcohol such as lauryl alcohol, oleyl alcohol, etc.; an aliphatic saturated or unsaturated monoamine such as stearylamine, oleylamine, etc.; an aliphatic saturated or unsaturated monocarboxylic acid amide such as lauric acid amide, oleic acid amide, etc.; a partial ester of a polyhydric alcohol such as glycerin, snrbitol, etc. and an aliphatic saturated or unsaturated monocarboxylic acid; and the like.

Such an oiliness agent may be used solely, or it may be used in combination of two or more kinds thereof. An adding amount thereof is selected within the range of preferably from 0.01 to 10% by mass, and more preferably from 0.1 to 5% by mass on the basis of a total amount of the composition.

(Metal Deactivator and Defoaming Agent)

Examples of the metal deactivator include a copper deactivator such as N—[N,N'-dialkyl(alkyl group having from 3 to 12 carbon atoms)aminomethyl]triazole, etc. and the like; and examples of the defoaming agent include a silicone oil, a fluorinated silicone oil, and the like.

[Lubricating Method of Refrigerating Machine by Using Lubricating Oil Composition for Compression Refrigerating Machine]

The lubricating oil composition for compression refrigerating machine of the present invention is suitable for a refrigerating machine using a refrigerant containing the above-described saturated fluorinated hydrocarbon having from 1 to 3 carbon atoms.

In the lubricating method of the refrigerating machine using the lubricating oil composition for refrigerating machine of the present invention, the use amount of the above-described refrigerant of every kind and the above-described lubricating oil composition for refrigerating machine is in the range of preferably from 99/1 to 10/90, and more preferably from 95/5 to 30/70 in terms of a mass ratio of (refrigerant)/(lubricating oil composition for refrigerating machine). When the amount of the refrigerant is smaller than the foregoing range, a lowering of the refrigeration capability is unfavorably observed, whereas when it is larger than the foregoing range, the lubricating properties are unfavorably lowered. Though the lubricating oil composition for refrigerating machine of the present invention can be used for various refrigerating machines, in particular, it can be preferably applied to a compression-type refrigeration cycle of a compression refrigerating machine.

[Refrigerating Machine]

The refrigerating machine to which the lubricating oil composition for refrigerating machine of the present invention is applied has a refrigeration cycle constituted by essential components including a compressor, a condenser, an expansion mechanism (such as an expansion valve, etc.), and an evaporator, or including a compressor, a condenser, an expansion mechanism, a dryer, and an evaporator, and it also uses, as a refrigerating machine oil, the above-described lubricating oil composition for refrigerating machine of the present invention and, as a refrigerant, the above-described refrigerant of every kind.

Here, it is preferable to fill the dryer with a desiccant composed of a zeolite having a pore diameter of not more than 0.33 nm. In addition, examples of this zeolite include a natural zeolite and a synthetic zeolite, and furthermore, this zeolite is more preferably one having a $CO_2$ gas absorption capacity of not more than 1% at 25° C. and a $CO_2$ gas partial pressure of 33 kPa. Examples of such a synthetic zeolite include trade names XH-9 and XH-600, manufactured by Union Showa K.K., and the like.

In the present invention, when such a desiccant is used, water can be efficiently removed without absorbing the refrigerant during the refrigeration cycle, and at the same time, powdering due to deterioration of the desiccant itself is suppressed. In consequence, there is no concern about clogging of a pipe generated due to powdering, abnormal abrasion to be caused due to invasion of the powder into a sliding member of the compressor, or the like, and thus, the refrigerating machine can be operated stably for a long period of time.

The refrigerating machine to which the lubricating oil composition for refrigerating machine of the present invention is applied has various sliding portions (for example, a bearing, etc.) within the compressor. In the present invention, in particular, a member composed of an engineering plastic or a member having an organic coating film or an inorganic coating film is used as this sliding portion from the standpoint of sealing properties.

Preferred examples of the above-described engineering plastic include a polyamide resin, a polyphenylene sulfide resin, a polyacetal resin, and the like from the standpoints of sealing properties, sliding properties, wear resistance, and the like.

In addition, examples of the organic coating film include a fluorine-containing resin coating film (such as a polytetrafluoroethylene coating film, etc.), a polyimide coating film, and a polyamide-imide coating film, and furthermore, a thermosetting insulating film formed by using a resin coating material containing a resin base material composed of a polyhydroxy ether resin and a polysulfone resin and a crosslinking agent, and the like from the standpoints of sealing properties, sliding properties, wear resistance, and the like.

On the other hand, examples of the inorganic coating film include a graphite film, a diamond-like carbon film, a nickel film, a molybdenum film, a tin film, a chromium film, and the like from the standpoints of sealing properties, sliding properties, wear resistance, and the like. This inorganic coating film may be formed by a plating treatment, or it may be formed by a PVD method (physical vapor deposition method).

Incidentally, the sliding portion may be formed of a conventional alloy system such as an Fe-base alloy, an Al-base alloy, a Cu-base alloy, etc.

[System Using Refrigerating Machine Oil Composition]

The lubricating oil composition for compression refrigerating machine of the present invention can be used for, for example, a car air conditioner, an electric car air conditioner, a gas heat pump, an air conditioner, a refrigerator, an automatic vending machine, a showcase, various hot water supply systems, a refrigerating/heating system, and the like.

In the present invention, the water content within the above-described system is preferably not more than 300 ppm by mass, and more preferably not more than 200 ppm by mass. In addition, a residual air partial pressure within the system is preferably not more than 10 kPa, and more preferably not more than 5 kPa.

The lubricating oil composition for compression refrigerating machine of the present invention contains, as a base oil, a specified oxygen-containing compound as a major component, and it has a low viscosity so that it is able to contemplate to enhance energy saving properties and is excellent in sealing properties.

EXAMPLES

Next, the present invention is described in more detail by reference to the following Examples, but it should be construed that the present invention is not limited to these Examples at all.

Incidentally, properties of a base oil and various properties of a lubricating oil composition for refrigerating machine were determined according to the following manners.

<Properties of Base Oil>

(1) Kinematic Viscosity at 100° C.:

The kinematic viscosity at 100° C. was measured using a glass-made capillary viscometer according to JIS K2283-1983.

(2) Number Average Molecular Weight:

The number average molecular weight was measured by means of gel permeation chromatography (GPC). For the GPC, HLC-8120GPC and SC-8020 (manufactured by Tosoh Corporation) were used, and the measurement was conducted with THF (tetrahydrofuran) as an eluent by using an IR detector. The number average molecular weight was determined from a calibration curve according to a polystyrene standard sample on the basis of the measurement results.

(3) Flash Point:

The flash point was measured according to JIS K2265 (COC method).

<Thermal Stability Test of Lubricating Oil Composition for Refrigerating Machine>

An autoclave having an internal capacity of 200 mL was filled with an oil/refrigerant mixture (ratio: 30 g/30 g, water content in oil: 500 ppm by mass) and a metal catalyst composed of iron, copper, and aluminum and then sealed, and the autoclave was held under a condition at an air pressure of 26.6 kPa and a temperature of 200° C. for 720 hours. Thereafter, appearance of the oil, a deposit, and change in properties of the catalyst were visually observed, and an acid value was also measured. Incidentally, the acid value was measured by an indicator method according to the "lubricating oil neutralization test method" defined in JIS K2501.

<Measurement of Two-Layer Separation Temperature>

A prescribed amount of a sample was added in a pressure-resistant glass ampule such that its amount was 10% by mass relative to Freon 32 difluoromethane (Freon 32), and this was connected to a vacuum pipe and a Freon 32 gas pipe. The ampule was subjected to vacuum deaeration at room temperature and then cooled with liquid nitrogen, thereby collecting a prescribed amount of the Freon 32. Subsequently, the ampule was sealed and gradually cooled from room temperature in a thermostat, thereby measuring a low-temperature separation temperature at which phase separation commenced. On the other hand, the ampule was gradually heated from room temperature to +40° C., thereby measuring a high-temperature separation temperature at which phase separation commenced.

<Formulation Components>

The kind of each of components used for the preparation of each of lubricating oil compositions for refrigerating machine is shown below.

(1) Base Oil:
PVE-A1 to PVE-A4: Polyethyl vinyl ether
PvE-B1 to PVE-B4: Polyethyl vinyl ether (PEVE)/[polyisobutyl vinyl ether copolymer (PIBVE/PIBVE (molar ratio) 9/1)]
PVE-C1 to PVE-C4: Polyethyl vinyl ether (PEVE)/[polyisobutyl vinyl ether copolymer (PIBVE/PIBVE (molar ratio) 8/2)]
PAG-1 to PAG-3: Polyoxypropylene glycol
ECP-1 to ECP-4: Polypropylene glycol (PPG)/polyethyl vinyl ether (PEV) copolymer (PPG/PEV molar ratio: 5/5).
POE-1 to POE-4: Pentaerythritol octanoate (C8 acid) nonanoate (C9 acid) ester (C8 acid/C9 acid molar ratio: 1/1.1)

The properties of these base oils are shown in Table 1.

(2) Antioxidant:
2,6-Di-t-butyl-4-methylphenol (0.3% by mass)

(3) Acid Scavenger:
2-Ethylhexyl glycidyl ether (0.3% by mass)

(4) Other Additives:
The following respective components were used and added in such a manner that the adding amounts of the components with respect to a total amount of the composition were the amounts (% by mass) shown in the parentheses, thereby making the total content of the components of 1.1% by mass.

Extreme pressure agent: Tricresyl phosphate (1.0% by mass).
Defoaming agent: Silicone-based defoaming agent (0.1% by mass)

Examples 1 to 18 and Comparative Examples 1 to 7

Refrigerating oil compositions each having a formulation shown in Table 2 were prepared by using the base oil described in Table 1, and the thermal stability of each of the above-described compositions was evaluated by using, as a refrigerant, R32 (difluoromethane) or R410A [50/50 (mass ratio) mixture of R32 and R125 (pentafluoroethane)]. The results are shown in Table 2.

TABLE 1

| Kind of base oil | Hydroxyl value (mgKOH/g) | Kinematic viscosity at 100° C. (mm²/s) | Number average molecular weight | Flash point (° C.) |
|---|---|---|---|---|
| PVE-A1 | 3 | 9.5 | 865 | 204 |
| PVE-A2 | 6 | 25.2 | 1200 | 228 |
| PVE-A3 | 15 | 7.5 | 660 | 201 |
| PVE-A4 | 21 | 8.4 | 560 | 200 |
| PVE-B1 | 2 | 8.0 | 665 | 201 |
| PVE-B2 | 7 | 20.5 | 980 | 225 |
| PVE-B3 | 15 | 10.1 | 760 | 199 |
| PVE-B4 | 25 | 10.3 | 740 | 201 |
| PVE-C1 | 3 | 10.8 | 670 | 199 |
| PVE-C2 | 9 | 19.5 | 965 | 219 |
| PVE-C3 | 13 | 7.7 | 580 | 195 |
| PVE-C4 | 20 | 11.0 | 720 | 200 |
| PAG-1 | 1 | 10.3 | 1020 | 221 |
| PAG-2 | 7 | 20.2 | 1450 | 228 |
| PAG-3 | 14 | 12.2 | 980 | 204 |
| PAG-4 | 33 | 9.5 | 870 | 199 |
| ECP-1 | 1 | 10.5 | 870 | 211 |
| ECP-2 | 8 | 10.6 | 860 | 216 |
| ECP-3 | 15 | 11.1 | 850 | 209 |
| ECP-4 | 27 | 10.0 | 750 | 210 |
| POE-1 | 1 | 8.5 | 670 | 265 |
| POE-2 | 9 | 10.0 | 675 | 268 |
| POE-3 | 11 | 10.5 | 680 | 265 |
| POE-4 | 23 | 8.9 | 665 | 266 |

TABLE 2

| | | | Example | | | | | | | | |
|---|---|---|---|---|---|---|---|---|---|---|---|
| | | | 1 | 2 | 3 | 4 | 5 | 6 | 7 | 8 | 9 |
| Formulation (% by mass) | Base oil | PVE-A1 | 98.30 | — | — | — | — | — | — | — | — |
| | | PVE-A2 | — | 98.30 | — | — | — | — | — | — | — |
| | | PVE-A3 | — | — | 98.30 | — | — | — | — | — | — |
| | | PVE-B1 | — | — | — | 98.30 | — | — | — | — | — |
| | | PVE-B2 | — | — | — | — | 98.30 | — | — | — | — |

TABLE 2-continued

|  |  |  |  |  |  |  |  |  |  |  |
|---|---|---|---|---|---|---|---|---|---|---|
|  |  | PVE-B3 | — | — | — | — | — | 98.30 | — | — | — |
|  |  | PVE-C1 | — | — | — | — | — | — | 98.30 | — | — |
|  |  | PVE-C2 | — | — | — | — | — | — | — | 98.30 | — |
|  |  | PVE-C3 | — | — | — | — | — | — | — | — | 98.30 |
|  |  | Antioxidant | 0.3 | 0.3 | 0.3 | 0.3 | 0.3 | 0.3 | 0.3 | 0.3 | 0.3 |
|  |  | Acid scavenger | 0.3 | 0.3 | 0.3 | 0.3 | 0.3 | 0.3 | 0.3 | 0.3 | 0.3 |
|  |  | Other additives | 1.1 | 1.1 | 1.1 | 1.1 | 1.1 | 1.1 | 1.1 | 1.1 | 1.1 |
| Thermal stability test |  | Refrigerant | | | | | R32 | | | | |
|  |  | Acid value (mgKOH/g) | 0.01> | 0.01> | 0.01> | 0.01> | 0.01> | 0.01> | 0.01> | 0.01> | 0.01> |
|  |  | Appearance of oil | Good | Good | Good | Good | Good | Good | Good | Good | Good |
|  |  | Deposit | Not formed | Not formed | Not formed | Not formed | Not formed | Not formed | Not formed | Not formed | Not formed |
|  |  | Appearance of catalyst Fe/Cu/Al | No/no/no | No/no/no | No/no/no | No/no/no | No/no/no | No/no/no | No/no/no | No/no/no | No/no/no |
| Two-layer separation temperature | | Separation temperature on low-temperature side (° C.) | 50 | Separated | 50 | 30 | Separated | 30 | Separated | Separated | Separated |
|  |  | Separation temperature on high-temperature side (° C.) | −5 | Separated | −5 | 20 | Separated | 20 | Separated | Separated | Separated |

|  |  |  | Example | | | | | | | | |
|---|---|---|---|---|---|---|---|---|---|---|---|
|  |  |  | 10 | 11 | 12 | 13 | 14 | 15 | 16 | 17 | 18 |
| Formulation (% by mass) | Base oil | PAG-A1 | 98.30 | — | — | — | — | — | — | — | — |
|  |  | PAG-A2 | — | 98.30 | — | — | — | — | — | — | — |
|  |  | PAG-A3 | — | — | 98.30 | — | — | — | — | — | — |
|  |  | ECP-B1 | — | — | — | 98.30 | — | — | — | — | — |
|  |  | ECP-B2 | — | — | — | — | 9.30 | — | — | — | — |
|  |  | ECP-B3 | — | — | — | — | — | 98.30 | — | — | — |
|  |  | POE-C1 | — | — | — | — | — | — | 98.30 | — | — |
|  |  | POE-C2 | — | — | — | — | — | — | — | 98.30 | — |
|  |  | POE-C3 | — | — | — | — | — | — | — | — | 98.30 |
|  |  | Antioxidant | 0.3 | 0.3 | 0.3 | 0.3 | 0.3 | 0.3 | 0.3 | 0.3 | 0.3 |
|  |  | Acid scavenger | 0.3 | 0.3 | 0.3 | 0.3 | 0.3 | 0.3 | 0.3 | 0.3 | 0.3 |
|  |  | Other additives | 1.1 | 1.1 | 1.1 | 1.1 | 1.1 | 1.1 | 1.1 | 1.1 | 1.1 |
| Thermal stability test |  | Refrigerant | | | | | R32 | | | | |
|  |  | Acid value (mgKOH/g) | 0.01> | 0.01> | 0.01> | 0.01> | 0.01> | 0.01> | 0.01> | 0.01> | 0.01> |
|  |  | Appearance of oil | Good | Good | Good | Good | Good | Good | Good | Good | Good |
|  |  | Deposit | Not formed | Not formed | Not formed | Not formed | Not formed | Not formed | Not formed | Not formed | Not formed |
|  |  | Appearance of catalyst Fe/Cu/Al | No/no/no | No/no/no | No/no/no | No/no/no | No/no/no | No/no/no | No/no/no | No/no/no | No/no/no |
| Two-layer separation temperature | | Separation temperature on low-temperature side (° C.) | Separated | Separated | Separated | Separated | Separated | Separated | Separated | Separated | Separated |
|  |  | Separation temperature on high-temperature side (° C.) | Separated | Separated | Separated | Separated | Separated | Separated | Separated | Separated | Separated |

|  |  |  | Comparative Example | | | | | | |
|---|---|---|---|---|---|---|---|---|---|
|  |  |  | 1 | 2 | 3 | 4 | 5 | 6 | 7 |
| Formulation (% by mass) | Base oil | PVE-A4 | 98.30 | 98.30 | — | — | — | — | — |
|  |  | PVE-B4 | — | — | 98.30 | — | — | — | — |
|  |  | PVE-C4 | — | — | — | 98.30 | — | — | — |
|  |  | PAG-4 | — | — | — | — | 98.30 | — | — |
|  |  | ECA-4 | — | — | — | — | — | 98.30 | — |
|  |  | POE-4 | — | — | — | — | — | — | 98.30 |
|  |  | Antioxidant | 0.3 | 0.3 | 0.3 | 0.3 | 0.3 | 0.3 | 0.3 |
|  |  | Acid scavenger | 0.3 | 0.3 | 0.3 | 0.3 | 0.3 | 0.3 | 0.3 |
|  |  | Other additives | 1.1 | 1.1 | 1.1 | 1.1 | 1.1 | 1.1 | 1.1 |
| Thermal stability test |  | Refrigerant | R32 | R410A | | | R32 | | |
|  |  | Acid value (mgKOH/g) | 0.35 | 0.22 | 0.38 | 0.34 | 0.49 | 0.38 | 1.45 |
|  |  | Appearance of oil | Good | Good | Good | Good | Good | Good | Good |
|  |  | Deposit | Yellow | Pale yellow | Yellow | Yellow | Yellow | Yellow | Brown |
|  |  | Appearance of catalyst Fe/Cu/Al | No/yes/no | No/yes/no | No/yes/no | No/yes/no | No/yes/no | No/yes/no | No/yes/no |
|  |  | Remark | Brown point found | Brown point found | Brown point found | Brown point found | Brown point found | Brown point found | Copper plated |

TABLE 2-continued

| | | | | | | | | |
|---|---|---|---|---|---|---|---|---|
| Two-layer separation temperature | Separation temperature on low-temperature side (° C.) | 50 | — | 30 | Separated | Separated | Separated | Separated |
| | Separation temperature on high-temperature side (° C.) | 0 | — | 20 | Separated | Separated | Separated | Separated |

The following are noted from Table 2.

In all of Examples 1 to 18 using the lubricating oil composition for compression refrigerating machine of the present invention for the system using R32 (difluoromethane) as a refrigerant, in the heat/oxidation stability test, the appearance of the oil is good, no deposit is formed, no discoloration of the catalyst is found, and the acid value is low.

On the other hand, in Comparative Examples 1 to 7, since a base oil having a low hydroxyl value is not used, not only the acid value is high, but the appearance of the oil assumes a yellow color, a pale yellow color, or a brown color, a deposit is formed, and the change in properties of the catalyst is conspicuous.

INDUSTRIAL APPLICABILITY

The lubricating oil composition for compression refrigerating machine of the present invention is useful for a compression refrigerating machine using a refrigerant which uses a saturated fluorinated hydrocarbon having from 1 to 3 carbon atoms and a low global warming potential, in particular, a refrigerant capable of being used for an air conditioner, a car air conditioner, and the like, and exhibits excellent heat/oxidation stability.

The invention claimed is:

1. A composition, comprising:
   (i) a refrigerant consisting of difluoromethane R32; and
   (ii) a lubricating composition consisting of
      a base oil consisting of at least one selected from the group consisting of
         a polyvinyl ether,
         a copolymer of a poly(oxy)alkylene glycol and a polyvinyl ether, and
         a copolymer of a poly(oxy)alkylene glycol monoether and a polyvinyl ether,
      wherein each base oil has a hydroxyl value of not more than 15 mgKOH/g,
      optionally from 0.01 to 5% by mass of an antioxidant, based on the total amount of the lubricating oil composition,
      optionally from 0.005 to 10% by mass of an acid scavenger, based on the total amount of the lubricating oil composition, and
      optionally at least one additive selected from the group consisting of an extreme pressure agent, an oiliness agent, a metal deactivator, and a defoaming agent.

2. The composition according to claim 1, wherein the base oil comprises, as a major component, the polyvinyl ether, wherein the polyvinyl ether is a compound comprising a constituent unit of formula (II):

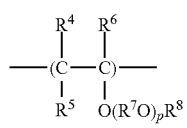

(II)

wherein:
   each of $R^4$, $R^5$, and $R^6$ independently represents a hydrogen atom or a hydrocarbon group comprising from 1 to 8 carbon atoms;
   $R^7$ represents a divalent hydrocarbon group comprising from 2 to 10 carbon atoms;
   $R^8$ represents a hydrocarbon group comprising from 1 to 10 carbon atoms;
   p represents a number of from 0 to 10 in terms of an average value thereof;
   each of $R^4$ to $R^8$ is independent for every constituent unit; and
   when plural $R^7$Os are present, each of the plural $R^7$Os is independent.

3. The composition according to claim 1, wherein the lubricating oil composition comprises at least one of the antioxidant and the acid scavenger.

4. The composition according to claim 1, wherein the base oil has a number average molecular weight of 300 or more and not more than 3,000.

5. The composition according to claim 1, wherein the base oil has a viscosity index of 60 or more.

6. The composition according to claim 1, wherein the lubricating oil composition comprises the at least one additive selected from the group consisting of the extreme pressure agent, the oiliness agent, the metal deactivator, and the defoaming agent.

7. The composition according to claim 1, wherein a sliding portion of the compression refrigerating machine comprises an engineering plastic, an organic coating film, or an inorganic coating film.

8. The composition according to claim 7, wherein the organic coating film is a polytetrafluoroethylene coating film; a polyimide coating film; a polyamide-imide coating film; or a thermosetting insulating film obtained by using a resin coating material comprising a resin base material, which comprises a polyhydroxy ether resin, a polysulfone-based resin, and a crosslinking agent.

9. The composition according to claim 7, wherein the inorganic coating film is a graphite film, a diamond-like carbon film, a tin film, a chromium film, a nickel film, or a molybdenum film.

10. The composition according claim 1, wherein the lubricating oil composition is suitable for use in a system, which is a car air conditioner, an electric car air conditioner, a gas heat pump, an air conditioner, a refrigerator, an automatic vending machine, a showcase, a hot water supply system, or a refrigerating/heating system.

11. The composition according to claim 10, wherein the system has a water content of not more than 300 ppm by mass and a residual air partial pressure of not more than 10 kPa.

12. The composition according to claim 1 wherein the base oil consists of the polyvinyl ether.

13. The composition according to claim 1, wherein the base oil consists of the copolymer of a poly(oxy)alkylene glycol and a polyvinyl ether.

14. The composition according to claim 1, wherein the base oil consists of the copolymer of a poly(oxy)alkylene glycol monoether and a polyvinyl ether.

15. The composition according to claim 1, wherein the base oil consists of the polyvinyl ether, and the polyvinyl ether has a hydroxyl value of not more than 6 mgKOH/g.

16. The composition according to claim 1, wherein the antioxidant is a phenol antioxidant, and wherein the acid scavenger a glycidyl ether acid scavenger.

17. The composition according to claim 2, wherein the polyvinyl ether having a constituent unit of formula (II) is a polymer or a copolymer in which an amount of a constituent unit wherein all of $R^4$, $R^5$, and $R^6$ are a hydrogen atom, p is 0, and $R^8$ is an ethyl group is from 50 to 100% by mole, and an amount of a constituent unit wherein all of $R^4$, $R^5$, and $R^6$ are a hydrogen atom, p is 0, and $R^8$ is an alkyl group having 3 or 4 carbon atoms is from 0 to 50% by mole.

18. The composition according to claim 2, wherein the polyvinyl ether having a constituent unit of formula (II) is a compound in which a proportion of the constituent unit wherein $R^8$ is an ethyl group is 100% by mole.

19. The composition according to claim 1, wherein the base oil consists of the polyvinyl ether, and the polyvinyl ether has a hydroxyl value of not more than 3 mgKOH/g.

* * * * *